United States Patent
Shimura

Patent Number: 6,072,414
Date of Patent: Jun. 6, 2000

[54] DYNAMIC FOCUS CIRCUIT

[75] Inventor: Tatsuhisa Shimura, Kanagawa, Japan

[73] Assignee: Matsushita Electric Industrial, Japan

[21] Appl. No.: 09/044,592

[22] Filed: Mar. 19, 1998

[30] Foreign Application Priority Data

Mar. 19, 1997 [JP] Japan .................................. 9-085966

[51] Int. Cl.[7] .................................................. H03M 1/66
[52] U.S. Cl. .......................................................... 341/144
[58] Field of Search ....................................... 341/144, 118, 341/120, 155; 348/806, 745, 807; 315/368.11, 368.12

[56] References Cited

U.S. PATENT DOCUMENTS 5,463,427 10/1995 Kawashima .............................. 348/806

FOREIGN PATENT DOCUMENTS

| | | |
|---|---|---|
| 0474420A2 | 11/1992 | Japan . |
| 05199428 | 6/1993 | Japan . |
| 5-199428 | 8/1993 | Japan . |
| 08166772 | 6/1996 | Japan . |

*Primary Examiner*—Brian Young
*Attorney, Agent, or Firm*—Rossi & Associates

[57] ABSTRACT

A dynamic focus circuit for achieving optimum focus for CRTs with any radius of the curvature. The dynamic focus circuit comprises a vertical rate correction waveform generator which generates a correction waveform in a vertical rate by digital operation; a digital-to-analog converter which converts the digital output of the vertical rate correction waveform generator to analog output; a horizontal rate correction waveform generator which generates a correction waveform in a horizontal rate by digital operation; and a digital-to-analog converter with variable reference voltage which receives the output of the digital-to-analog converter, that is the vertical rate correction waveform, as a reference voltage, and the output of the horizontal rate correction waveform generator as digital input for conducting digital-to-analog conversion.

2 Claims, 2 Drawing Sheets

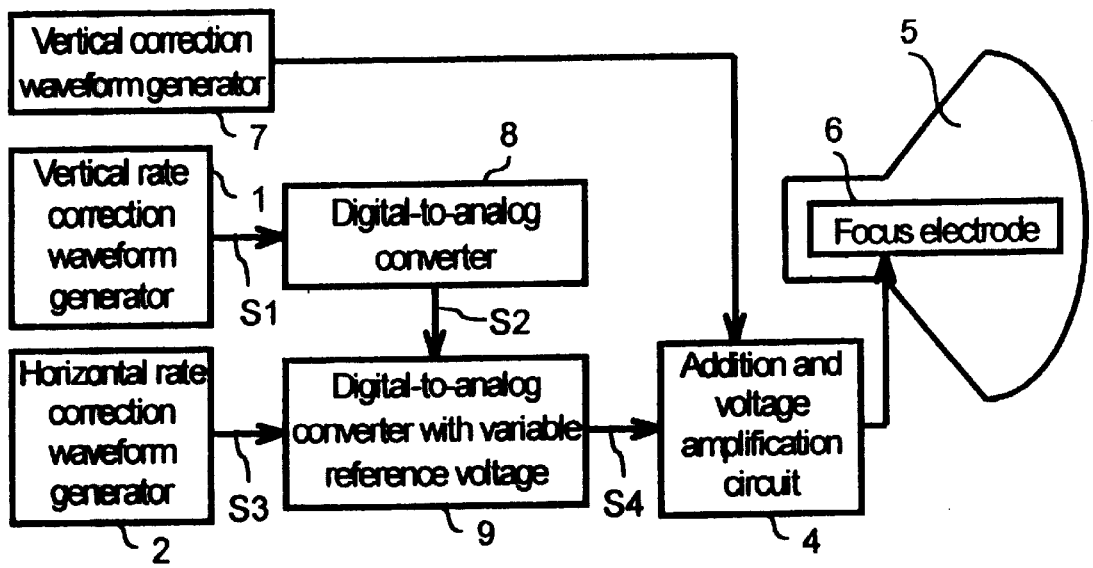
FIG. 1
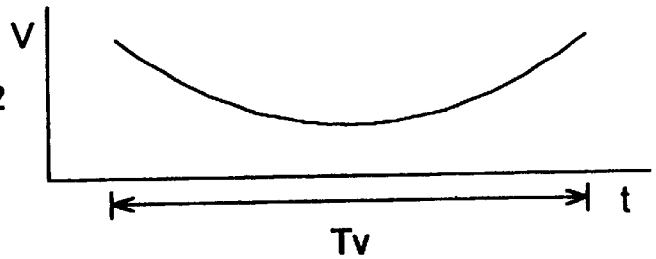
FIG. 2A  S1, S2
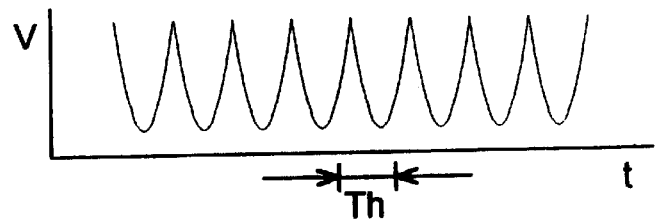
FIG. 2B  S3
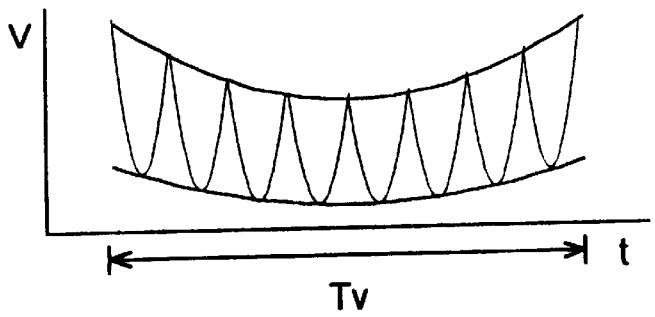
FIG. 2C  S4

– 1 –

DYNAMIC FOCUS CIRCUIT

FIELD OF THE INVENTION

The present invention relates to the field of dynamic focus circuits employed in display monitors of CRTs (cathode ray tubes).

BACKGROUND OF THE INVENTION

A dynamic focus circuit is employed in CRT display monitors to make the focal length longer at the periphery of CRT screens by adjusting focusing of the electron beam from the electron lens of the electron gun in the CRTs, thereby improving focusing at all areas on CRT screens from the center to periphery. The dynamic focus circuit of the prior art achieves such adjustment by superimposing parabolic voltage modulated by the frequency of horizontal deflection and vertical deflection on the focus voltage to be applied to the focus electrode in the electron gun.

FIG. 3 shows an electrical block diagram of an example of the dynamic focus circuit of the prior art. In the dynamic focus circuit of the prior art, as shown in FIG. 3, the output of a vertical parabolic focus voltage generator 31, which has a higher voltage at the upper and lower ends in vertical deflection, and the output of a horizontal parabolic focus voltage generator 32, which has a higher voltage at the right and left ends in horizontal deflection, are sent to a multiplier 33. The output of the multiplier 33 and the output of the vertical parabolic focus voltage generator 31 are then added and amplified in an addition and amplification unit 34. The added and amplified output is finally applied to a focus electrode 36 in an electron gun of a CRT 35. With the above configuration, the dynamic focus circuit focus circuit of the prior art achieves an optimum focus over the entire screen even for CRT screens with large radius of the curvature. See, for example, Japanese Laid-open Patent No. H5-199428.

Requirements have recently arisen, however, for waveforms other than a parabolic waveform for use in correcting the focus voltage to an optimum form, such as in a case of a completely flat screen where the radius of the curvature of a CRT is considered to be infinite.

In addition, a high frequency has recently been employed as the horizontal deflection frequency for reducing flickering of CRTs. This requires a more complicated and expensive circuit configuration for the analog multiplier to produce the focus voltage waveform due to technical reasons including incidental oscillation. Furthermore, the configuration of the analog amplifier may require a variable resistor or a variable amplifier, resulting in the configuration requiring expensive bipolar or Bi-CMOS discrete components. In other words, the configuration of the analog multiplier in the prior art may not be realizable by employing a monolithic IC, resulting in difficulty in reducing the surface mounting area of a printed circuit board. The conventional configuration may not also be realizable with an IC using an inexpensive C-MOS process.

SUMMARY OF THE INVENTION

A dynamic focus circuit of the present invention comprises a vertical rate correction waveform generator for producing a correction waveform in a vertical rate by digital operation; a digital-to-analog converter for digital-to-analog conversion of the output of the vertical rate correction waveform generator; a horizontal rate correction waveform generator for producing a correction waveform in a horizontal rate by digital operation; and a digital-to-analog converter with variable reference voltage for digital-to-analog conversion. The digital-to-analog converter with variable reference voltage receives the vertical rate correction waveform, that is the output of the digital-to-analog converter, as a reference voltage, and the output of the horizontal rate correction waveform generator as a digital input.

The above circuit configuration realizes a dynamic focus circuit employing a LSI, an inexpensive process, which enables optimum focusing in CRTs with any radius of the curvature.

BRIEF DESCRIPTION OF THE DRAWINGS

FIG. 1 is an electrical block diagram of a dynamic focus circuit in accordance with an exemplary embodiment of the present invention.

FIG. 2A–2C are electrical wave forms of each part of the dynamic focus circuit in FIG. 1.

DESCRIPTION OF THE PREFERRED EMBODIMENT

Figure 3:
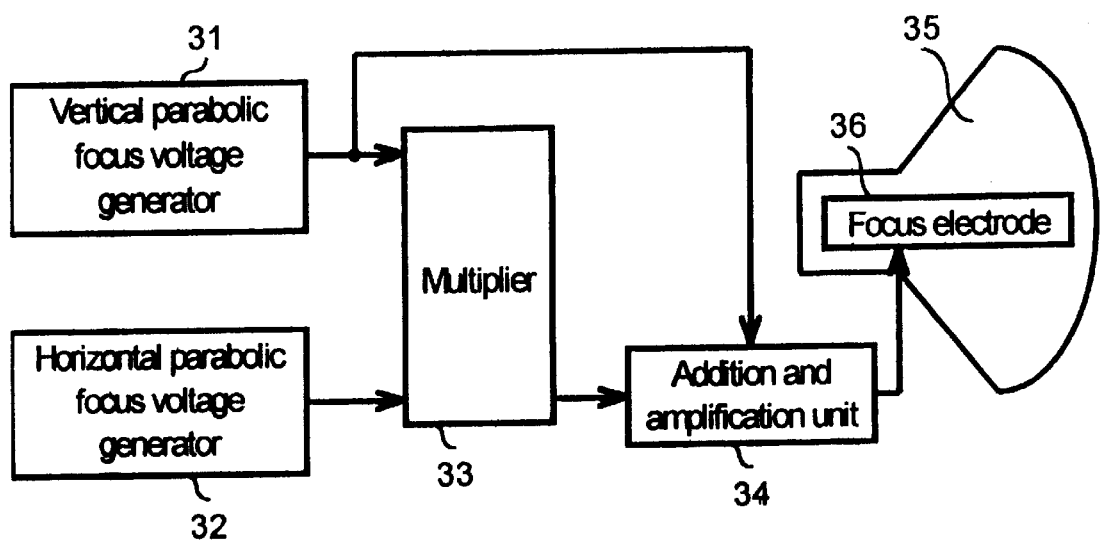
FIG. 3 is an electrical block diagram of a dynamic focus circuit of the prior art.

An exemplary embodiment of the present invention is explained with reference to FIG. 1, 2A to 2C. A dynamic focus circuit of the present invention comprises a vertical rate (vertical frequency) correction waveform generator 1, a digital-to-analog converter 8 which receives the output signal of the vertical rate correction waveform generator 1, a horizontal rate (horizontal frequency) correction waveform generator 2, a digital-to-analog converter with variable reference voltage 9 which receives the output signal of the horizontal rate correction waveform generator 2 and the output signal of the digital-to-analog converter 8, a vertical correction waveform generator 7, and an addition and voltage amplification circuit 4 which receives the output signal of the vertical correction waveform generator 7 and the output signal of the digital-to-analog converter with variable reference voltage 9. Electrical wave forms S1, S2, S3, S4 of each part of the dynamic focus circuit are shown in FIG. 2A to 2C.

The vertical rate correction waveform generator 1 calculates and outputs a digital correction waveform S1 with a cycle Tv in a vertical rate synchronizing to the vertical synchronizing signal input to a display monitor. Calculation is conducted in the vertical rate correction waveform generator 1 for each specified scanning line to output an optimum correction value S1 for a specified time position t as shown in FIG. 2A (that is a specified position on a screen) based on the position of the vertical synchronizing signal (e.g. the upper end of the screen). The correction output S1 is not a parabolic function but an optimum function for optimum focus for CRTs with any radius of the curvature. The digital-to-analog converter 8 is, in general, a digital-to-analog converter of PWM (Pulse Width Modulation) type or R-2R ladder resistance type. The digital-to-analog converter 8 converts the digital waveform output S1 from the vertical rate correction waveform generator 1 to analog waveform S2 as in FIG. 2A at a real time speed.

The horizontal rate correction waveform generator 2 calculates and outputs a digital correction waveform S3 with a cycle Th in a horizontal rate synchronizing to the horizontal synchronizing signal input to the display monitor. For example, calculation is conducted for each clock, which is the horizontal synchronizing frequency multiplied by an integer, to output an optimum correction output value S3 for a specified time position t as shown in FIG. 2B (that is a specified horizontal position on a screen) based on the position of the horizontal synchronizing signal (e.g. the left end of the screen). The correction output S3 is not a parabolic function but an optimum function for optimum focus for CRTs with any radius of the curvature. An operation method for obtaining optimum vertical and horizontal correction output values S1 and S3 differs with conditions such as radius of the curvature of a CRT.

The analog reference voltage for the digital-to-analog converter with variable reference voltage 9 is externally controllable. The digital-to-analog converter with variable reference voltage 9 receives the output S2 of the digital-to-analog converter 8 as a reference voltage, receives the output S3 of the horizontal rate correction waveform generator 2 as an input digital signal, and outputs a correction waveform S4 with a corrected horizontal rate. The digital/analog converter with variable reference voltage 9 may require high-speed conversion for obtaining waveform for the horizontal rate. Therefore, a digital-to-analog converter of R-2R ladder resistance type or R-String type is generally employed.

The output waveform S4 of the digital-to-analog converter with variable reference voltage 9 is added with the vertical correction waveform output from the vertical correction waveform generator 7, and its voltage is amplified in the addition and voltage amplification circuit 4. The output after addition and voltage amplification is then applied to a focus electrode 6 in an electron gun of a CRT 5. The vertical correction waveform generator 7 is a circuit for generating an optimum vertical correction waveform for optimum focus for CRTs with any radius of the curvature.

The dynamic focus circuit of the present invention as explained above thus achieves optimum focus for CRTs with any radius of the curvature by changing elements to be operated (e.g. amplitude and function of waveform) in the vertical rate correction waveform generator 1 and the horizontal rate correction waveform generator 2.

Functions required for digital-to-analog conversion, as well as digital operation, can also be realized with a monolithic IC of the general C-MOS process, thereby allowing the employment of an inexpensive one-chip LSI.

Accordingly, the dynamic focus circuit of the present invention enables the employment of an inexpensive monolithic IC used in the C-MOS process for achieving optimum focus for CRTs with any radius of the curvature.

REFERENCE NUMERALS 1 vertical rate correction waveform generator
2 horizontal rate correction waveform generator
4 addition and voltage amplification circuit
5 CRT (cathode ray tube)
6 focus electrode
7 vertical correction waveform generator
8 digital-to-analog converter
10 digital-to-analog converter with variable reference voltage

What is claimed is:

1. A dynamic focus circuit comprising:

digital-to-analog conversion means with variable reference voltage which receives an analog value of a correction waveform generated in a vertical rate as a reference voltage and a digital value of a correction waveform generated in a horizontal rate as a digital input for conducting digital-to-analog conversion.

2. A dynamic focus circuit comprising:

vertical rate correction waveform generating means for generating a correction waveform in a vertical rate by digital operation;

digital-to-analog conversion means for converting the digital output of said vertical rate correction waveform generating means to analog output;

horizontal rate correction waveform generating means for generating a correction waveform in a horizontal rate by digital operation; and digital-to-analog conversion means with variable reference voltage which receives a vertical rate correction waveform output from said digital-to-analog conversion means as a reference voltage and an output of said horizontal rate correction waveform generating means as digital input for conducting digital-to-analog conversion.

* * * * *